United States Patent
Takeuchi et al.

(10) Patent No.: US 6,835,408 B2
(45) Date of Patent: Dec. 28, 2004

(54) OIL OR FAT COMPOSITION

(75) Inventors: Hiroyuki Takeuchi, Yokohama (JP); Megumi Arimoto, Fujisawa (JP); Fumie Asami, Yokohama (JP); Nobuo Taguchi, Yokosuka (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 0 days.

(21) Appl. No.: 09/440,137

(22) Filed: Nov. 15, 1999

(65) Prior Publication Data

US 2002/0001660 A1 Jan. 3, 2002

(30) Foreign Application Priority Data

Nov. 13, 1998 (JP) .......................................... 10-323665
Feb. 26, 1999 (JP) .......................................... 11-049300

(51) Int. Cl.$^7$ .................................................. A23L 9/00
(52) U.S. Cl. ........................ 426/606; 426/607; 426/601
(58) Field of Search ................................ 426/606, 607, 426/601

(56) References Cited

U.S. PATENT DOCUMENTS

| | | | | |
|---|---|---|---|---|
| 2,874,056 A | * | 2/1959 | Drew | |
| 3,600,186 A | | 8/1971 | Mattson et al. | |
| 3,658,555 A | * | 4/1972 | Menz | 426/607 |
| 4,269,864 A | * | 5/1981 | Chirafisi et al. | 426/583 |
| 4,407,821 A | * | 10/1983 | Mendy | 424/312 |
| 4,526,793 A | * | 7/1985 | Ingenbleek | 426/72 |
| 4,678,807 A | * | 7/1987 | Cotter | 514/552 |
| 4,832,975 A | * | 5/1989 | Yang | 426/603 |
| 4,847,296 A | * | 7/1989 | Babayan et al. | 514/552 |
| 4,863,753 A | * | 9/1989 | Hunter | 426/633 |
| 4,871,768 A | * | 10/1989 | Bistrian | 514/547 |
| 4,952,606 A | * | 8/1990 | Babayan | 514/552 |
| 5,006,359 A | * | 4/1991 | Senda | 426/565 |
| 5,116,819 A | * | 5/1992 | Trimbo | 514/21 |
| 5,120,563 A | * | 6/1992 | Mohlenkamp | 426/607 |
| 5,192,572 A | * | 3/1993 | El-Nokaly | 426/438 |
| 5,288,512 A | * | 2/1994 | Seiden | 426/607 |
| 5,308,640 A | * | 5/1994 | Baer et al. | 426/611 |
| 5,364,632 A | * | 11/1994 | Benita | 424/450 |
| 5,378,484 A | * | 1/1995 | Suwa et al. | 426/329 |
| 5,380,544 A | * | 1/1995 | Klemann | 426/607 |
| 5,395,629 A | * | 3/1995 | Bertoli | 426/607 |
| 5,431,719 A | * | 7/1995 | Clapp | 426/609 |
| 5,492,714 A | * | 2/1996 | Guskey | 426/607 |
| 5,571,553 A | * | 11/1996 | Stein | 426/607 |
| 5,578,576 A | * | 11/1996 | Leddin | 514/2 |
| 5,587,190 A | * | 12/1996 | Guezennec | 426/2 |
| 5,601,860 A | * | 2/1997 | Lien | 426/72 |
| 5,635,199 A | * | 6/1997 | Trimbo | 424/439 |
| 5,681,608 A | * | 10/1997 | Cain et al. | 426/606 |
| 5,686,490 A | * | 11/1997 | Okazaki | 514/558 |
| 6,013,665 A | * | 1/2000 | DeMichele et al. | |
| 6,160,007 A | * | 12/2000 | DeMichele et al. | |

FOREIGN PATENT DOCUMENTS

| | | | |
|---|---|---|---|
| EP | 0488800 | * | 6/1992 |
| EP | 0537113 | * | 4/1993 |
| GB | 2090115 | * | 12/1981 |
| JP | 501812 | | 4/1992 |
| JP | 404187629 | * | 7/1992 |
| JP | 300826 | | 10/1992 |
| JP | 60180 | | 3/1996 |
| JP | 269478 | | 10/1996 |
| JP | 410099020 | * | 4/1998 |
| JP | 176181 | | 6/1998 |
| WO | WO85/03002 | * | 7/1985 |
| WO | WO 94/28734 | * | 12/1994 |
| WO | WO 95/31110 | * | 11/1995 |

OTHER PUBLICATIONS

Gunstone, 1983. Lipids in Foods. Chemistry, Biochemistry and Technology. Pergamon Press, New York, pp. 24, 145, 146.*
21 CFR 166.40. 1998, pp. 406–408.*
Eiyogaku Review (Dietetics Review), vol. 4 No. 4, 1996, pp. 23–33.
J. Lipid Res., vol. 37, 1996, pp. 708–726.
Search Report (Japanese).

* cited by examiner

*Primary Examiner*—Carolyn Paden
(74) *Attorney, Agent, or Firm*—Nixon & Vanderhye P.C.

(57) ABSTRACT

There is provided an oil or fat composition composed chiefly of triglycerides wherein the amount of medium-chain fatty acids in all the fatty acids composing the oil or fat composition is 5 to 23% by mass and the amount of triglycerides having two medium-chain fatty acid residues in the molecule in all the triglycerides is 1 to 20% by mass.

The oil or fat composition is low in body fat accumulation, has equal cooking properties with conventional edible oils and has good flavor and high safety.

7 Claims, No Drawings

OIL OR FAT COMPOSITION

FIELD OF THE INVENTION AND RELATED ART STATEMENT

This invention relates to an oil or fat composition for food. More specifically, it relates to an oil or fat composition which is less accumulated as body fat and is excellent in cooking properties and flavor as edible oil.

Obesity is a state of body fat being accumulated in excess, and it is well known that many diseases including metabolic disorders such as diabetes and hyperlipemia and diseases in circulatory organs such as hypertension and ischemic cardiac diseases tend to follow obesity. According to the results of the national nutrition investigation carried out by the Japanese Welfare Ministry, one of seven adults is obese, and obesity is a close problem not only in Europe and America but also in Japan. Fat contained in meals is one of nutrients most profoundly related to the accumulation of body fat, but the excessive ingestion of fat may result in obesity. However, fat has intrinsic taste, and meals of extremely reduced fat are often insufficient to give satisfaction. Further, when deep-fried food or fried food is made, an edible oil is indispensable as a heating medium.

For resolving such situation, so-called fat substitutes have been developed. However, none of them are fully satisfactory in safety, physical properties, cooking properties and flavor. For example, it is disclosed that sucrose fatty acid esters are not absorbed in the digestive tract and excreted into the feces, and can be used as a low calorie oil (U.S. Pat. No. 3,600,186). In the United States of America, sucrose fatty acid esters are permitted to be used for salty snack confectionery, and potato chips in use of them are already put on the market, but the indication of "There is a possibility that abdominal convulsions or loose passages are caused" and "The absorption of fat soluble vitamins is inhibited" is compulsory for commodities in use of sucrose fatty acid esters. The energy density of protein or carbohydrates is half or less that of fat. Thus, it is known that by processing protein or carbohydrates so that fat-like physical properties or flavor may come out, low calorie fat substitutes can be provided (Eiyogaku Review (Dietetics Review), volume 4, No. 4, pages 23–33, 1996). It is possible to make low calorie ice creams, bakery products, cakes by using such fat substitutes. However, they have the disadvantages that they are poor in resistance to heat and cannot be used as heating media for deep-frying or frying.

In Japanese Laid-open Patent Publication (Tokuhyohei) No. 501812/1992, it is disclosed that a low calorie oil or fat can be provided using triglycerides composed of long-chain fatty acids and short-chain fatty acids. However, triglycerides composed of short-chain fatty acids have peculiar odor, and are not suitable as general purpose edible oils because foodstuffs to be cooked using them are limited. Further, medium-chain fatty acids are known to be lower in body fat accumulation because they are more easily be converted into energy (J. Lipid Res. 37, 708–726 (1996)). However, although triglycerides composed of medium-chain fatty acids are intrinsically high in safety, it is reported that if a large amount of them are ingested, symptoms such as diarrhea, nausea, stomach aches, heartburn and anorexia are caused. Oil or fat compositions containing diglycerides as effective components and being lower in body fat accumulation are disclosed in Japanese Laid-open Patent Publication Nos. 300826/1992, 60180/1996 and 176181/1998. However, the safety of oil or fat compositions abundantly containing diglycerides is not completely proved. Moreover, it is difficult to produce diglycerides in high concentration at low costs, and such oil or fat compositions have the disadvanage that they are hard to use for general purposes from the economical viewpoint. In Japanese Laid-open Patent Publication No. 269478/1996 is disclosed an oil or fat composition composed of diglycerides and triglycerides, which contains triglycerides having two medium-chain fatty acid residues in the molecule in an amount of 31% by mass or more and is less in body fat accumulation. However, this invention has the same problem as in the above Japanese Laid-open Patent Publication Nos. 300826/1992, 60180/1996 and 176181/1998 because diglycerides are also used as effective components. Further, the composition has the disadvantages that since a large amount of medium-chain fatty acids are contained, its smoke point is low and there is striking foaming, and thus it is not suitable for frying (deep frying or frying) cooking.

OBJECT AND SUMMARY OF THE INVENTION

The object of the invention lies in providing an oil or fat composition which is low in body fat accumulation, has equal cooking properties with conventional edible oils and has good flavor and high safety.

In order to attain the above object, the present inventors have made sequential researches, and as a result they have found that the amount of medium-chain fatty acid residues in all the fatty acid residues and the amount of triglycerides having two medium-chain fatty acid residues in all the triglycerides are closely related with the degree of body fat accumulation, and have completed this invention.

Thus the invention relates to an oil or fat composition being low in body accumulation, composed chiefly of triglycerides wherein the amount of medium-chain fatty acids in all the fatty acids composing the oil or fat composition is 5 to 23% by mass and the amount of triglycerides having two medium-chain fatty acid residues in the molecule in all the triglycerides is 1 to 20% by mass. The medium-chain fatty acids are preferably saturated fatty acids having 6 to 12 carbon atoms. Further, it is preferred that the amount of triglycerides having three medium-chain fatty acid residues in the molecule in all the triglycerides composing the oil or fat composition is 3% by mass or less. The amount of long-chain saturated fatty acids in all the long-chain fatty acids composing the oil or fat composition is 20% by mass or less. When emulsifiers, especially emulsifiers in specific combinations are incorporated into the oil or fat composition, frying (deep frying and frying) properties, particularly antifoaming can further be enhanced.

The invention also relates to an oil or fat composition for cooking being low in body fat accumulation and having equal cooking properties and stability in storage with conventional edible oil, which comprises such an oil or fat composition and conventional additives for oil or fat compositions for cooking.

DETAILED DESCRIPTION OF THE INVENTION

In the invention, when the term "frying" is used alone, it is assumed to include both deep frying and frying. This is also applied when a like word such as "fried" is used alone.

The oil or fat composition of the invention chiefly comprises triglycerides. The term "chiefly" is assumed to mean that triglycerides are contained in an amount of 85% by mass or more, preferably 95% by mass or more in the oil or fat composition.

The medium-chain fatty acids in the invention are assumed to mean fatty acids, particularly saturated fatty acids, having 6 to 12 carbon atoms. As examples, there can be mentioned caproic acid, caprylic acid, capric acid and lauric acid, and saturated fatty acids having 8 to 10 carbon atoms, particularly caprylic acid and capric acid are preferred. The long-chain fatty acids in the invention are assumed to mean saturated or unsaturated fatty acids having 14 or more, preferably 14 to 22 carbon atoms. As the long-chain fatty acids, there can be mentioned those having 14 or more, preferably 14 to 22 carbon atoms, for example, long-chain saturated fatty acids such as myristic acid, palmitic acid, stearic acid, arachidic acid, behenic acid, lignoceric acid and cerotic acid, and long-chain unsaturated fatty acids such as myristoleic acid, pentadecenoic acid, palmitoleic acid, hexadecatrienoic acid, heptadecenoic acid, oleic acid, linolic acid, □-linolenic acid, □-linolenic acid, octadecatetraenoic acid, icosenoic acid, icosadienoic acid, icosatrienoic acid, icosatetraenoic acid, arachidonic acid, icosapentaenoic acid, docosenoic acid, docosadienoic acid, docosapentaenoic acid and docosahexaenoic acid. A fatty acid residue is a group obtained by removing the OH of the carboxyl group from a fatty acid.

In the oil or fat composition of the invention, it is necessary that the amount of medium-chain fatty acids in all the fatty acids composing the oil or fat composition is 5 to 23% by mass and the amount of triglycerides having two medium-chain fatty acid residues in the molecule in all the triglycerides is 1 to 20% by mass. Beyond these scopes, the merit of low body fat accumulation cannot be obtained. The amount of medium-chain fatty acids is preferably 6 to 23% by mass, and the amount of the triglycerides is preferably 3 to 20% by mass.

Further, the amount of triglycerides having three medium-chain fatty acid residues in the molecule in all the triglycerides composing the oil or fat composition is preferably 3% by mass or less, more preferably 2% by mass or less, still more preferably 1% by mass or less. If the amount is more than 3% by mass, smoking and foaming increase at the time of cooking, and the oil or fat composition is not suitable as an oil or fat for frying. If the amount is 1% by mass or less, remarkable improvement is observed in smoking and foaming.

Further, the amount of long-chain saturated fatty acids in all the long-chain fatty acids composing the oil or fat composition is preferably 20% by mass or less, more preferably 15% by mass or less, still more preferably 7% by mass or less. If the amount is more than 20% by mass, stability at low temperatures is lowered, crystallization of oil or fat comes to occur in the oil or fat composition, and it usually becomes unfit for eating without heating.

The oil or fat composition of the invention being low in body fat accumulation can be obtained by suitably mixing oil or fat and medium-chain fatty acids as raw materials, carrying out transesterification reaction either using sodium methylate as a catalyst or in the presence of a lipolytic enzyme, and, at that time, adjusting the transesterification reaction so that the amount of medium-chain fatty acids in all the fatty acids composing the oil or fat composition and the amount of triglycerides having two medium-chain fatty acid residues in the molecule in all the triglycerides may fall within the above specific ranges.

In the transesterification reaction, in addition to the above adjustment, by adjusting the amount of triglycerides having three medium-chain fatty acid residues in the molecule in all the triglycerides composing the oil or fat composition, and/or the amount of long-chain saturated fatty acids in all the long-chain fatty acids composing the oil or fat composition so that these amounts may be in the above specific ranges, there can be obtained an oil or fat composition which is low in body fat accumulation, and has reduced smoking and foaming at the time of frying, and/or is excellent in stability at low temperatures.

As the raw material oil or fat, there can be mentioned conventional edible oil or fat, for example, soybean oil, rapeseed oil, rapeseed oil containing oleic acid in a high concentration, corn oil, sesame oil, sesame salad oil, beafsteak plant oil, linseed oil, peanut oil, safflower oil, safflower oil containing oleic acid in a high concentration, sunflower seed oil, sunflower seed oil containing oleic acid in a high concentration, cotton seed oil, grape seed oil, macadamia nut oil, hazel nut oil, pumpkinseed oil, walnut oil, camellia oil, tea seed oil, perilla oil, borage oil, olive oil, rice bran oil, wheat germ oil, palm oil, palm kernel oil, coconut oil, cacao butter, tallow, lard, chicken fat, cream, fish oil, seal oil, seaweed oil, and these oils or fats having reduced their saturation by breed improvement, these oils or fats having hydrogenated, oils or fats obtained from these oils or fats by fractionation, etc.

Although some description was made about the medium-chain fatty acids, medium-chain fatty acid triglycerides can also be used either in place of or together with the medium-chain fatty acids. As the medium-chain fatty acid triglycerides, there can be used triglycerides obtained by subjecting medium-chain fatty acids and glycerol to esterification reaction according to a conventional method, but there can preferably be used single acid triglycerides or mixed acid triglycerides composed of saturated fatty acids having 8 to 10 carbon atoms such as fatty acids obtained by hydrolysis of coconut oil, generally called MCT (Medium Chain Triglycerides), for example triglycerides of caprylic acid/capric acid=60/40~75/25 (mass ratio).

The amount of medium-chain fatty acids in all the fatty acids composing the oil or fat composition, the amount of triglycerides having two medium-chain fatty acid residues in the molecule in all the triglycerides, and, if necessary, the amount of triglycerides having three medium-chain fatty acid residues in the molecule in all the triglycerides composing the oil or fat composition, and, if necessary, the amount of long-chain saturated fatty acids in all the long-chain fatty acids composing the oil or fat composition can be adjusted by taking the composition of the raw material oil or fat into account, adjusting the use amount between the raw material oil or fat and the medium-chain fatty acids and measuring the reaction product during the transesterification reaction for triglyceride composition.

When the transesterification reaction is carried out using sodium methylate as a catalyst, a raw material oil or fat is mixed with medium-chain fatty acid triglycerides at a mass ratio (the former/the latter) of 71/29~97/3, and the mixture is heated to 80 to 120° C. under a reduced pressure of 100 mmHg or less to remove gaseous components and water contained in the raw material mixture. Transesterification reaction is carried out by adding sodium methylate thereto at an amount of 0.02 to 0.5% by mass and stirring the mixture at 80 to 120° C. for 10 to 60 minutes either under normal pressure and a nitrogen gas stream or under a reduced pressure of 10 mm Hg or less. The completion of the reaction is confirmed by measuring the reaction mixture for triglyceride composition using gas chromatography. The cessation of the reaction is made by adding water or an acid such as phosphoric acid to the reaction product. Then, sufficient washing by water is made to remove the catalyst and the excess acid, and, after drying, the reaction product is decolored and deodorized by conventional methods. When the transesterification is carried out using a lipolytic enzyme, a raw material oil or fat is mixed with medium-chain fatty acids or medium-chain fatty acid triglycerides at a mass ratio (the former/the latter) of 71/29~97/3, and the mixture is adjusted to temperature in the range of 40 to 100° C., which is enough to exert the activity of the lipolytic enzyme. A lipolytic enzyme is added thereto in an amount of 0.005 to 10% by mass based on the raw material mixture, and transesterification reaction is carried out for 2 to 48 hours. This reaction is preferably carried out under normal pressure in a stream of nitrogen. The completion of the reaction is confirmed by measuring the reaction mixture for triglyceride composition using gas chromatography. The cessation of the reaction is carried out by removing the enzyme by filtration. The reaction product is washed by water, dried, and then decolored and deodorized by conventional methods. When medium-chain fatty acids were used, the free fatty acids are removed, after the cessation of the reaction, by a film evaporator.

If the transesterification using the lipolytic enzyme is insufficient, the amount of triglycerides having three medium-chain fatty acid residues in the molecule becomes high. An oil or fat composition which is high in the amount of triglycerides having three medium-chain fatty acid residues in the molecule has the merit of being low in body fat accumulation, but is not preferred because of intense smoking and foaming at the time of continuous frying cooking.

As the lipolytic enzyme, there can be mentioned lipases derived from the genus Alcaligenes, Candida, Rhizopus, Mucor or Pseudomonas and phospholipase A derived from liver, etc., but lipases derived from the genus Candida or Rhizopus are particularly preferred.

The oil or fat composition of the invention can also be obtained by extraction from a plant such as soybean, rapeseed, corn, coconut, palm, olive, linseed, sunflower seed, safflower, camellia, cotton seed or cuphea which was improved for breeds so as to produce the oil or fat composition of the invention using the technique of genetic recombination.

By incorporating emulsifiers into the oil or fat composition of the invention, frying properties, particularly antifoaming can further be enhanced. As such emulsifers, there can be mentioned sucrose fatty acid esters, polyglycerol fatty acid esters, succinic acid monoglycerides, monoglycerides, diglycerides, sorbitol fatty acid esters, sorbitan fatty acid esters, etc., and they can be used alone or in combination of two or more kinds. The emulsifiers can be incorporated in an amount of 0.1 to 6% by mass, preferably 0.3 to 5% by mass as a whole based on the oil or fat composition before the incorporation.

The sucrose fatty acid esters are esters between sucrose and saturated or unsaturated fatty acids having 6 to 22 carbon atoms, and it is preferred that the average substitution degree of all the hydroxyl groups is 37.5 to 87.5% and the amount of polyesters not less than triesters in all the sucrose fatty acid esters is 85% by mass or more. The polyglycerol fatty acid esters are esters between polyglycerol and saturated or unsaturated fatty acids having 6 to 22 carbon atoms, and it is preferred that the average substitution degree of all the hydroxyl groups is 20 to 80%. The polyglycerol includes polyglycerols not less than triglycerides, preferably not more than decaglycerides. The monoglycerides or diglycerides includes monoesters or diesters between glycerol or diglycerol and saturated or unsaturated fatty acids having 6 to 22 carbon atoms, respectively, but the monoesters (monoglycerides) are preferred. As the succinic acid monoglycerides, there can preferably be used succinic acid monoglycerides obtained by esterifying monoglycerides or diglycerides with succinic acid at a ratio (the latter/the former) of 3:1 to 0.1:1. As the sorbitol fatty acid esters or sorbitan fatty acid esters, mono- to triesters between sorbitol or sorbitan and saturated or unsaturated fatty acids having 6 to 22 carbon atoms are preferred. In the above, as examples of the saturated or unsaturated fatty acids having 6 to 22 carbon atoms, there can be mentioned those mentioned as examples of medium-chain fatty acids and long-chain fatty acids. As the combination of the emulsifiers, it is most preferred, for further enhancement of frying properties, particularly antifoaming, to incorporate 0.1 to 3% by mass at least one kind of sucrose fatty acid esters and polyglycerol fatty acid esters, 0.01 to 2% by mass succinic acid monoglycerides, and 0.1 to 3% by mass at least one kind of monoglycerides, diglycerides, sorbitol fatty acid esters and sorbitan fatty acid esters under the condition that the total amount of the emulsifiers is 0.3 to 5% by mass, based on the oil or fat composition of the invention before the incorporation.

The thus obtained oil or fat composition of the invention can be used, either as such or after incorporation of conventional additives for oil or fat compositions for cooking, as an oil or fat composition for cooking.

As such additives, there can be mentioned polyglycerol fatty acid esters, sucrose fatty acid esters, sorbitan fatty acid esters, vitamin E, ascorbic acid fatty acid esters, lignan, coenzyme Q, phospholipids, oryzanols, diglycerides, etc. for the purposes of enhancement of stability in storage, enhancement of stability to oxidation, enhancement of stability to heat, inhibition of crystallization at low temperatures, etc., and vitamin E, ascorbic acid fatty acid esters, lignan, coenzyme Q, phospholipids, oryzanols, etc. in expectation for action to prevent diseases of adult people, action to prevent diseases from habits in life, action to inhibit in vivo oxidation, and action to prevent obesity.

The oil or fat composition for cooking of the invention has flavor equal to or more than that of edible oils on the market such as rapeseed oil, corn oil, safflower oil and soybean oil, and can be used not only for cooking such as frying, deep-frying or marinating, but also in foods containing oil or fat such as dressing, mayonnaise, margarine, confectionery, cake, beverages, etc. The characteristic of flavor differs depending on the kinds of foods, but it is possible to make plain foods wherein the tastes of the materials are kept alive. Further, the degree of sputtering of oil at the time of frying cooking is equal to or less than that of conventional edible oils. An action to lower the concentration of lipids in the blood can also be expected by continuously taking a suitable amount of the oil or fat composition for cooking of the invention.

The invention is specifically described below according to examples, but it is not limited thereby.

EXAMPLE 1

Rapeseed oil (made by THE NISSHIN OIL MILLS, LTD.) (80 mass parts) and 20 mass parts of MCT wherein the composing fatty acids are caprylic acid/capric acid=3/1 by mass ratio were mixed, and stirred at 120° C. under reduced pressure to carry out deaeration and dehydration. Sodium methylate (0.1 mass part) was added thereto as a catalyst, and random transesterification reaction was carried out at 120° C. for 30 minutes. The reaction product was washed by water, dried, decolored and deodorized by conventional methods to obtain Composition 1. To Composition 1 were added 2.5% by mass sucrose fatty acid esters (made by Mitsubishi Kagaku Foods Co., trade name: Ryoto-sugar ester O-170), 0.1% by mass succinic monoglycerides (made by Riken Vitamin Co., trade name: Poem B-10) and 1.% by mass sorbitan fatty acid esters (made by Riken Vitamin Co., trade name: Poem P-80) to obtain Composition 2. Compositions 1 and 2 were measured for triglyceride composition and fatty acid composition by gas chromatography using column GS-1 and according to "Kijun Yushi Bunseki Shikenho (Standard Method for Analyzing Oils and Fats) (1996)", respectively (this is also the case with the following examples and comparative examples). The results are shown in Table 1.

EXAMPLE 2

Lipase QL (made by Meito Sangyo Co., Ltd.)(0.1 mass part) was added to the mixture of 85 mass parts of soybean salad oil (made by THE NISSHIN OIL MILLS, LTD.) with 15 mass parts of MCT wherein the composing fatty acids are caprylic acid/capric acid=3/1 by mass ratio, and transesterification reaction was carried out under stirring at 60° C. for 15 hours. The enzyme was filtered out from the reaction product, and the filtration was washed by water and dried, and then decolored and deodorized to obtain Composition 3. The triglyceride composition and the fatty acid composition of Composition 3 are shown in Table 1.

EXAMPLE 3

After 77 mass parts of palm oil (made by THE NISSHIN OIL MILLS, LTD.) and 23 mass parts of a medium-chain fatty acid mixture of caprylic acid/capric acid=1/1 by mass ratio were mixed, 0.1 mass part of Lipase QL (made by Meito Sangyo Co., Ltd.) was added, and transesterification reaction was carried out under stirring at 60° C. for 15 hours. After the reaction, the enzyme was filtered out, free fatty acids in the filtration were removed by a film evaporator, and the filtration was decolored and deodorized to obtain Composition 4. The triglyceride composition and the fatty acid composition of Composition 4 are shown in Table 1.

EXAMPLE 4

After 77 mass parts of corn oil (made by THE NISSHIN OIL MILLS, LTD.) and 23 mass parts of a medium-chain fatty acid mixture of caprylic acid/capric acid=1/1 by mass ratio were mixed, 0.1 mass part of Lipase QL (made by Meito Sangyo Co., Ltd.) was added, and transesterification reaction was carried out under stirring at 60° C. for 15 hours. After the reaction, the enzyme was filtered out, free fatty acids in the filtration were removed by a film evaporator, and the filtration was decolored and deodorized to obtain Composition 5. The triglyceride composition and the fatty acid composition of Composition 5 are shown in Table 1.

EXAMPLE 5

Rapeseed oil (made by THE NISSHIN OIL MILLS, LTD.) (93 mass parts) and 7 mass parts of MCT wherein the composing fatty acids are caprylic acid/capric acid=3/1 by mass ratio were mixed, and stirred at 120° C. under reduced pressure to carry out deaeration and dehydration. Sodium methylate (0.1 mass part) was added thereto as a catalyst, and random transesterification reaction was carried out at 120° C. for 30 minutes. The reaction product was washed by water, dried, decolored and deodorized by conventional methods to obtain Composition 6. The triglyceride composition and the fatty acid composition of Composition 6 are shown in Table 2.

EXAMPLE 6

Rapeseed oil (made by THE NISSHIN OIL MILLS, LTD.) (90 mass parts) and 10 mass parts of MCT wherein the composing fatty acids are caprylic acid/capric acid=3/1 by mass ratio were mixed, and stirred at 120° C. under reduced pressure to carry out deaeration and dehydration. Sodium methylate (0.1 mass part) was added thereto as a catalyst, and random transesterification reaction was carried out at 120° C. for 30 minutes. The reaction product was washed by water, dried, decolored and deodorized by conventional methods to obtain Composition 7. The triglyceride composition and the fatty acid composition of Composition 7 are shown in Table 2.

EXAMPLE 7

Lipase QL (made by Meito Sangyo Co., Ltd.) (0.1 mass part) was added to the same mixture as in Example 2, and transesterification reaction was carried out under stirring at 60° C. for 3 hours. The enzyme was filtered out from the reaction product, and the filtration was washed by water, dried, decolored and deodorized by conventional methods to obtain Composition 8. The triglyceride composition and the fatty acid composition of Composition 8 are shown in Table 2.

Comparative Example 1

Rapeseed oil (made by THE NISSHIN OIL MILLS, LTD.) (75 mass parts) and 25 mass parts of MCT wherein the composing fatty acids are caprylic acid/capric acid=3/1 by mass ratio were mixed, and stirred at 120° C. under reduced pressure to carry out deaeration and dehydration. Sodium methylate (0.1 mass part) was added thereto as a catalyst, and random transesterification reaction was carried out at 120° C. for 30 minutes. The reaction product was washed by water, dried, decolored and deodorized by conventional methods to obtain Composition 9. The triglyceride composition and the fatty acid composition of Composition 9 are shown in Table 3.

Comparative Example 2

Rapeseed oil (made by THE NISSHIN OIL MILLS, LTD.) (97 mass parts) and 3 mass parts of MCT wherein the composing fatty acids are caprylic acid/capric acid=3/1 by mass ratio were mixed, and stirred at 120° C. under reduced pressure to carry out deaeration and dehydration. Sodium methylate (0.1 mass part) was added thereto as a catalyst, and random transesterification reaction was carried out at 120° C. for 30 minutes. The reaction product was washed by water, dried, decolored and deodorized by conventional methods to obtain Composition 10. The triglyceride composition and the fatty acid composition of Composition 10 are shown in Table 3.

TABLE 1

Analytical values of oil or fat compositions (% by mass)

| | Example | | | | |
|---|---|---|---|---|---|
| | Composition 1 | Composition 2 | Composition 3 | Composition 4 | Composition 5 |
| Triglyceride composition | | | | | |
| 3M0L | 1.5 | 1.5 | tr. | 2.0 | 1.9 |
| 2M1L | 15.9 | 15.9 | 10.2 | 19.1 | 18.5 |
| 1M2L | 44.2 | 44.2 | 41.1 | 45.4 | 45.5 |
| 0M3L | 38.4 | 38.4 | 48.7 | 38.5 | 34.1 |
| Fatty acid composition | | | | | |
| C8:0 | 14.4 | 14.3 | 10.5 | 10.8 | 11.0 |
| C10:0 | 4.8 | 4.6 | 3.4 | 11.1 | 11.2 |
| C12:0 | 0.0 | 0.0 | 0.0 | 1.0 | 0.0 |
| C14:0 | 0.0 | 0.0 | 0.0 | 0.8 | 0.0 |
| C16:0 | 3.2 | 3.1 | 8.6 | 33.3 | 10.2 |
| C18:0 | 1.6 | 2.0 | 3.3 | 3.3 | 1.6 |
| C18:1 | 49.2 | 49.4 | 20.7 | 31.6 | 23.3 |
| C18:2 | 17.9 | 17.9 | 46.2 | 7.9 | 42.7 |
| C18:3 | 8.9 | 8.7 | 7.1 | 0.0 | 0.0 |
| others | 0.0 | 0.0 | 0.2 | 0.2 | 0.0 |

Note)
M; medium - chain fatty acid,
L; long - chain fatty acid,
tr. = trace, for example C8:0 means that the carbon numder is 8 and the number of unsaturated bond (carbon - carbon double bond) is 0 (likewise in Tables 2, 3 and 4)

TABLE 2

Analytical values of oil or fat compositions (% by mass)

| | Example | | |
|---|---|---|---|
| | Composition 6 | Composition 7 | Composition 8 |
| Triglyceride composition | | | |
| 3M0L | 0.1 | tr. | 4.8 |
| 2M1L | 3.4 | 5.1 | 6.1 |
| 1M2L | 25.6 | 31.9 | 35.1 |
| 0M3L | 70.9 | 63.0 | 54.0 |
| Fatty acid composition | | | |
| C8:0 | 5.0 | 7.2 | 10.9 |
| C10:0 | 1.8 | 2.4 | 3.0 |
| C12:0 | 0.0 | 0.0 | 0.0 |
| C14:0 | 0.0 | 0.0 | 0.0 |
| C16:0 | 3.5 | 3.6 | 8.1 |
| C18:0 | 2.1 | 1.8 | 3.8 |
| C18:1 | 56.2 | 55.1 | 20.0 |
| C18:2 | 20.9 | 19.8 | 46.9 |
| C18:3 | 10.2 | 10.1 | 7.2 |
| others | 0.3 | 0.0 | 0.1 |

TABLE 3

Analytical values of oil or fat compositions (% by mass)

| | Comparative example | |
|---|---|---|
| | Composition 9 | Composition 10 |
| Triglyceride composition | | |
| 3M0L | 2.8 | tr. |
| ZM1L | 21.0 | 0.5 |
| 1M2L | 45.5 | 11.7 |
| 0M3L | 30.7 | 87.8 |

TABLE 3-continued

Analytical values of oil or fat compositions (% by mass)

| | Comparative example | |
|---|---|---|
| | Composition 9 | Composition 10 |
| Fatty acid composition | | |
| C8:0 | 18.5 | 2.1 |
| C10:0 | 5.9 | 1.0 |
| C12:0 | 0.0 | 0.0 |
| C14:0 | 0.0 | 0.0 |
| C16:0 | 3.1 | 3.7 |
| C18:0 | 1.5 | 2.1 |
| C18:1 | 45.9 | 58.5 |
| C18:2 | 16.7 | 21.7 |
| C18:3 | 8.4 | 10.6 |
| others | 0.0 | 0.3 |

TABLE 4

Analytical values of oil or fat compositions (% by mass)

| | Control | | |
|---|---|---|---|
| | Soybean oil | Rapeseed oil | Mixed oil |
| Triglyceride composition | | | |
| 3M0L | 0 | 0 | 20.0 |
| 2M1L | 0 | 0 | — |
| 1M2L | 0 | 0 | — |
| 0M3L | 100 | 100 | 80.0 |
| Fatty acid composition | | | |
| C8:0 | 0.0 | 0.0 | 15.1 |
| C10:0 | 0.0 | 0.0 | 4.9 |
| C12:0 | 0.0 | 0.0 | 0.0 |
| C14:0 | 0.0 | 0.0 | 0.0 |
| C16:0 | 10.5 | 3.8 | 3.1 |

TABLE 4-continued

Analytical values of oil or fat compositions (% by mass)

| | Control | | |
|---|---|---|---|
| | Soybean oil | Rapeseed oil | Mixed oil |
| C18:0 | 3.8 | 2.2 | 1.8 |
| C18:1 | 23.6 | 60.3 | 48.0 |
| C18:2 | 54.2 | 22.4 | 17.9 |
| C18:3 | 7.6 | 10.9 | 8.9 |
| others | 0.3 | 0.4 | 0.3 |

EXAMPLE 8

A feed having added thereto soybean oil (made by THE NISSHIN OIL MILLS, LTD.)(control) (the triglyceride composition and the fatty acid composition are shown in Table 4) or Composition 1, 6, 7, 9 or 10 in an amount of 25% by mass, was left to be ingested freely for 8 weeks by 4-week-old Wistar strain male rats. The composition of the feed is shown in Table 5. For preventing the lack of essential fatty acids, the soybean oil was added to each feed in an amount of 3% by mass. As vitamins and minerals, those recommended by the American Nutrient Society were used, and their addition amounts to the feed were adjusted by energy density. Eight weeks after the administration of the experimental feeds, 8 animals from each group were dissected, and the mass of the visceral fat was measured. Further, for measuring the mass of the subcutaneous fat, each cadaver was freeze-dried and measured for the fat content using a Soxhlet's extractor. The results about the rats having been fed for 8 weeks are shown in Table 6. Statistically significant difference was not observed among all the test groups in the mass of ingested feed, final body weight and tail length. The visceral fat mass and subcutaneous fat mass of the rats having been fed for 8 weeks were statistically low values in the groups of Compositions 1, 6 and 7. It was revealed from the results of the animal test that when Composition 1, 6 or 7 of the invention, wherein the amount of medium-chain fatty acids in all the fatty acids composing the oil or fat composition, and the amount of triglycerides having two medium-chain fatty acid residues in the molecule in all the triglycerides fall in the range of the invention, was used, body fat accumulation was lower, compared with the case where the control oil or comparative Composition 9 or 10 was used.

TABLE 5

Feed composition

| | Composition % |
|---|---|
| Oil or fat composition | 25.0 |
| Corn starch | 25.1 |
| Casein | 25.4 |
| Sucrose | 10.0 |
| Soybean oil | 3.0 |
| Cellulose | 5.0 |
| Mineral mixture | 4.5 |
| Vitamin mixture | 1.3 |
| L-cystine | 0.38 |
| Choline bitartrate | 0.32 |

TABLE 6

Results of animal experiment (8 weeks feeding)

| | Soybean oil (control) | Composition 1 | Composition 6 | Composition 7 | Composition 9 | Composition 10 |
|---|---|---|---|---|---|---|
| Ingested feed mass (g/8 weeks) | 694 ± 7 | 688 ± 9 | 698 ± 7 | 691 ± 5 | 690 ± 6 | 699 ± 7 |
| Final body weight (g) | 294 ± 5 | 285 ± 4 | 286 ± 5 | 285 ± 5 | 289 ± 6 | 290 ± 6 |
| Tail length (cm) | 18 ± 1 | 18 ± 1 | 19 ± 1 | 18 ± 1 | 18 ± 1 | 18 ± 1 |
| Visceral fat mass (g) | 21 ± 2 | 17 ± 1* | 17 ± 1* | 18 ± 1* | 19 ± 2 | 21 ± 1 |
| Subcutaneous fat mass (g) | 30 ± 2 | 25 ± 1* | 26 ± 1* | 26 ± 1* | 29 ± 2 | 28 ± 1 |

Note)
Data are shown in average value ± standard deviation.
Symbol *; There is significant difference at a 5% or less level of significance compared with the control.

EXAMPLE 9

A cooking test and a cold resistant test were carried out using oil or fat compositions. As to the cooking test, smoking, foaming, sputtering of the oil and flavor of the cooked product were evaluated. As to the cold resistant test, the appearance at the time of storage at a low temperature was observed. As oil or fat composition samples were used 7 ones, namely rapeseed oil (made by THE NISSHIN OIL MILLS, LTD.) (control), Composition 1, Composition 2, Composition 4, Composition 6, Composition 8 and an oil wherein rapeseed oil and MCT wherein the composing fatty acids are caprylic acid/capric acid=3/1 by mass ratio were mixed at a mass ratio of 4:1 (mixed oil). The triglyceride composition and the fatty acid composition of the rapeseed oil and the mixed oil are shown in Table 4.

The results of the cooking test are shown in Table 7. It was revealed from the results of the cooking test that Compositions 1, 2, 4, 6 and 8 of the invention, wherein the amount of medium-chain fatty acids in all the fatty acids composing the oil or fat composition, and the amount of triglycerides having two medium-chain fatty acid residues in the molecule in all the triglycerides fall in the range of the invention, have cooking properties equal to those of the usual edible oil. Further, Compositions 1, 2, 4 and 6, wherein the amount of triglycerides having three medium-chain fatty acid residues in the molecule in all the triglycerides composing the oil or fat composition is 3% by mass or less, have high stability at the time of the deep-frying cooking. Particularly, Composition 2 wherein the emulsifiers were incorporated was revealed to be excellent in antifoaming effect. Further, the same 7 samples were allowed to stand at 5° C. for 48 hours and observed for appearance. The results are shown in Table 7. As a result, in Composition 4, deposition of crystals was observed, but the other samples had transparent appearance.

Smoking: A Teflon-coated frypan of diameter 24 cm was heated in advance for 30 seconds, 15 g of a sample oil was put therein and heating was made for further 30 seconds. Then, foodstuffs for vegetable frying were put in the frypan, the mixture was heated for 3 minutes, and proper amounts of salt and pepper were added. Smoking at the time of the frying cooking was observed with the naked eye.

Foaming, oil sputtering, flavor: A sample oil (600 g) was put in a household electric fryer, 4 battered prawns were put therein, and one minute later, the foaming and sputtering of the oil were observed. Further, the flavor of the cooked prawns (tempura) was evaluated.

Stability in deep frying: A sample oil (600 g) was put in a household electric fryer, battered prawns were deep-fried for 30 minutes, foodstuffs for croquettes were deep-fried for 30 minutes, and finally chicken for frying without coating was deep-fried for 30 minutes, respectively at 180° C. Stability in deep frying cooking was evaluated by the degree of occurrence of stable fine foam. Deep frying was stopped when the occurrence of stable fine foam became 100% of the fryer surface area.

Cold resistance: The appearance was observed at the time of storage at a low temperature (allowed to stand at 5° C. for 48 hours).

What is claimed is:

1. An oil or fat composition at least 85% by mass of which are triglycerides, wherein
   (a) the amount of medium-chain fatty acids in all the fatty acids as constituents of the oil or fat composition is from 5 to 23% by mass,

TABLE 7

Results of the cooking test and the cold resistant test

|  | Rapeseed oil (control) | Mixed oil | Composition 1 | Composition 2 | Composition 4 | Composition 6 | Composition 8 |
| --- | --- | --- | --- | --- | --- | --- | --- |
| Smoking | 10 | 5 | 8 | 8 | 8 | 9 | 8 |
| Foaming | 10 | 1 | 8 | 10 | 8 | 9 | 8 |
| Oil sputtering | 10 | 5 | 9 | 9 | 9 | 9 | 9 |
| Flavor | 10 | 10 | 10 | 10 | 10 | 10 | 10 |
| Deep frying stability | 10 | 1 | 8 | 9 | 8 | 8 | 6 |
| Cold resistance (5° C.) | 10 | 8 | 8 | 8 | 5 | 8 | 8 |

Note)
Evaluation was made as follows using rapeseed oil as a control (10 points): 10~7 points; usable, 6~4 points; there is a little problem for use, 3~1 points; unusable.

(b) the amount of triglycerides having two medium-chain fatty acid residues in the molecule in all the triglycerides is from 1 to 20% by mass, and (c) the amount of long-chain saturated fatty acids in all of the long-chain fatty acids as constituents of the oil or fat composition is at most 15% by mass;

the oil or fat composition being obtained by transesterifying an edible oil or fat with a medium-chain fatty acid or a medium-chain fatty acid triglyceride; the oil or fat composition being supplemented with 0.1 to 6% by mass of the composition of at least one emulsifier selected from sucrose fatty acid esters, polyglycerol fatty acid esters, succinic acid monoglycerides, sorbitol fatty acid esters and sorbitan fatty acid esters; the oil or fat composition being enhanced in antifoaming.

2. The oil or fat composition according to claim 1 wherein the medium-chain fatty acids are saturated fatty acids having 6 to 12 carbon atoms.

3. The oil or fat composition according to claim 1 wherein the amount of triglycerides having three medium-chain fatty acid residues in the molecule in all the triglycerides is at most 3% by mass.

4. An oil or fat composition at least 85% by mass of which are triglycerides, wherein (a) the amount of medium-chain fatty acids in all the fatty acids as constituents of the oil or fat composition is from 5 to 23% by mass, (b) the amount of triglycerides having two medium-chain fatty acid residues in the molecule in all the triglycerides is from 1 to 20% by mass, and (c) the amount of long-chain saturated fatty acids in all of the long-chain fatty acids as constituents of the oil or fat composition is at most 15% by mass;

the oil or fat composition being obtained by transesterifying an edible oil or fat with a medium-chain fatty acid or a medium-chain fatty acid triglyceride; the oil or fat composition being supplemented with 0.1 to 3% by mass of the composition of at least one emulsifier selected from sucrose fatty acid esters and polyglycerol fatty acid esters, 0.01 to 2% by mass of the composition of at least one emulsifier selected from succinic acid monoglycerides, and 0.1 to 3% by mass of the composition of at least one emulsifier selected from monoglycerides, diglycerides, sorbitol fatty acid esters and sorbitan fatty acid esters, provided that the total amount of the emulsifiers is 0.3 to 5% by mass of the composition; the oil or fat composition being enhanced in antifoaming.

5. The oil or fat composition according to claim 4 wherein the medium-chain fatty acids are saturated fatty acids having 6 to 12 carbon atoms.

6. The oil or fat composition according to claim 4 wherein the amount of triglycerides having three medium-chain fatty acid residues in the molecule in all the triglycerides is at most 3% by mass.

7. An oil or fat composition at least 85% by mass of which are triglycerides, wherein (a) the amount of medium-chain fatty acids in all the fatty acids as constituents of the oil or fat composition is from 5 to 23% by mass, (b) the amount of triglycerides having two medium-chain fatty acid residues in the molecule in all the triglycerides is from 1 to 20% by mass, and (c) the amount of long-chain saturated fatty acids in all of the long-chain fatty acids as constituents of the oil or fat composition is at most 15% by mass;

the oil or fat composition being obtained by transesterifying an edible oil or fat with a medium-chain fatty acid or a medium-chain fatty acid triglyceride; the oil or fat composition being supplemented with 0.1 to 6% by mass of the composition of at least one emulsifier selected from sucrose fatty acid esters, polyglycerol fatty acid esters, succinic acid monoglycerides, sorbitol fatty acid esters and sorbitan fatty acid esters; the oil or fat composition also containing at least one additive selected from ① ascorbic acid fatty acid esters, ② lignan, ③ coenzyme Q, ④ phospholipids and ⑤ oryzanols; the composition being enhanced in antifoaming.

* * * * *